United States Patent
Li et al.

(10) Patent No.: US 11,031,626 B2
(45) Date of Patent: Jun. 8, 2021

(54) ELECTROLYTIC SOLUTION AND ELECTROCHEMICAL DEVICE CONTAINING THE SAME

(71) Applicant: NINGDE AMPEREX TECHNOLOGY LIMITED, Ningde (CN)

(72) Inventors: Wenqiang Li, Ningde (CN); Shuirong Zhang, Ningde (CN); Chao Tang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 172 days.

(21) Appl. No.: 16/211,537

(22) Filed: Dec. 6, 2018

(65) Prior Publication Data

US 2020/0099101 A1    Mar. 26, 2020

(30) Foreign Application Priority Data

Sep. 21, 2018  (CN) .......................... 201811106685.2

(51) Int. Cl.

| H01M 10/0567 | (2010.01) |
|---|---|
| H01M 4/36 | (2006.01) |
| H01M 4/505 | (2010.01) |
| H01M 4/525 | (2010.01) |
| H01M 10/42 | (2006.01) |
| H01M 4/02 | (2006.01) |

(52) U.S. Cl.
CPC ....... *H01M 10/0567* (2013.01); *H01M 4/364* (2013.01); *H01M 4/505* (2013.01); *H01M 4/525* (2013.01); *H01M 10/4235* (2013.01); H01M 2004/028 (2013.01); H01M 2300/0025 (2013.01)

(58) Field of Classification Search
CPC .... H01M 10/0567; H01M 10/42; H01M 4/36; H01M 4/505; H01M 4/525; H01M 10/4235; H01M 4/364; H01M 2300/0025; H01M 2004/028
See application file for complete search history.

(56) References Cited

U.S. PATENT DOCUMENTS

| 9,437,869 | B2 * | 9/2016 | Jito ........................ H01M 4/366 |
|---|---|---|---|
| 2012/0313570 | A1 * | 12/2012 | Ohtaniuchi ....... H01M 10/4235 320/103 |
| 2014/0322596 | A1 | 10/2014 | Shatunov et al. |
| 2016/0301103 | A1 | 10/2016 | Kim et al. |
| 2017/0018803 | A1 * | 1/2017 | Wang ................... H01M 10/0569 |
| 2017/0125845 | A1 * | 5/2017 | Yu ..................... H01M 10/0569 |
| 2017/0288268 | A1 | 10/2017 | Kim et al. |
| 2018/0108947 | A9 | 4/2018 | Zhuang |
| 2018/0233778 | A1 | 8/2018 | Park et al. |
| 2019/0245245 | A1 | 8/2019 | Zhang et al. |

FOREIGN PATENT DOCUMENTS

| CN | 101640290 | A | 2/2010 |
|---|---|---|---|
| CN | 102244294 | A | 11/2011 |
| CN | 102522590 | A | 6/2012 |
| CN | 103348516 | A | 10/2013 |
| CN | 103401020 | A | 11/2013 |
| CN | 103633371 | A | 3/2014 |
| CN | 103779607 | A | 5/2014 |
| CN | 103928708 | A | 7/2014 |
| CN | 103956517 | A | 7/2014 |
| CN | 104332653 | A | 2/2015 |
| CN | 104752769 | A | 7/2015 |
| CN | 104766995 | A | 7/2015 |
| CN | 104979589 | A | 10/2015 |
| CN | 105074993 | A | 11/2015 |
| CN | 105098237 | A | 11/2015 |
| CN | 105355968 |  * | 2/2016 |
| CN | 105355968 | A | 2/2016 |
| CN | 105355975 | A | 2/2016 |
| CN | 105529498 | A | 4/2016 |
| CN | 105609874 | A | 5/2016 |
| CN | 105680088 | A | 6/2016 |
| CN | 105895957 | A | 8/2016 |
| CN | 106099185 | A | 11/2016 |
| CN | 106654128 | A | 5/2017 |
| CN | 106784589 | A | 5/2017 |
| CN | 106816633 | A | 6/2017 |
| CN | 107275553 | A | 10/2017 |
| CN | 107394269 | A | 11/2017 |
| CN | 107408734 | A | 11/2017 |
| CN | 103682416 | B | 2/2018 |

(Continued)

OTHER PUBLICATIONS

CN 105355968 MT (Year: 2016).*
Decision to grant a Patent (Year: 2020).*
Chinese Office Action and Search Report dated Dec. 27, 2019, in corresponding Chinese application 201811106685.2, 8 pages in Chinese.
Extended European Search Report dated Jan. 14, 2020 in European application 19198416.0, 7 pages in English.
Chinese First Office Action dated Jan. 19, 2020 in Chinese counterpart application 201811108529.X, 12 pages in Chinese.

*Primary Examiner* — Alexander Usyatinsky

(74) *Attorney, Agent, or Firm* — Juan Carlos A. Marquez; Marquez IP Law Office, PLLC

(57) ABSTRACT

The present application relates to an electrolytic solution and an electrochemical device containing the electrolytic solution. The electrolytic solution of the present invention comprises a compound having a —CN functional group, and is capable of significantly improving the floating-charge performance, the increased impedance accompanying the long-term cycle test, and the thermal impact performance of an electrochemical device using the electrolytic solution.

18 Claims, No Drawings

(56) References Cited

FOREIGN PATENT DOCUMENTS

| | | |
|---|---|---|
| CN | 108242567 A | 7/2018 |
| CN | 109301326 A | 2/2019 |
| JP | 2017022108 A | 1/2017 |
| KR | 101195931 B1 | 10/2012 |
| KR | 1020170051286 A | 5/2017 |

* cited by examiner

ELECTROLYTIC SOLUTION AND ELECTROCHEMICAL DEVICE CONTAINING THE SAME

CROSS REFERENCE TO RELATED APPLICATIONS

The present application claims the benefit of priority from the China Patent Application No. 201811106685.2, filed on 21 Sep. 2018, the disclosure of which is hereby incorporated by reference in its entirety.

BACKGROUND

1. Field of the Invention

The present application relates to an electrolytic solution, and an electrochemical device containing the electrolytic solution.

2. Description of the Related Art

With the popularization and application of smart products, the demand for electronic products, such as mobile phones, notebook computers, and cameras, has increased year by year. As a working power source for electronic products, electrochemical devices that have the characteristics of high energy density, no memory effect and high working voltage are replacing traditional Ni—Cd and MH—Ni batteries step by step. However, as electronic products are becoming thinner and more portable, the standards for electrochemical devices have become higher and higher. It is imperative to develop an electrochemical device that is safe and capable of withstanding high temperatures and various harsh conditions. Especially, due to the frequent occurrence of battery swelling, automatic shutdown and combustion explosion of electronic products after a period of use in the market, newer and higher standards are required in the market for the safety of batteries during use and for the increased impedance of batteries performing after a long time. How to solve the safety problems of the electrochemical devices while taking into account the impedance problem under the cycle performance has always been an afflicting problem.

In order to solve the above problems, compounds containing a —CN functional group are introduced into an electrolytic solution of an electrochemical device in the present application. The addition of this compound can significantly improve the floating-charge performance, the increased impedance in the long-time cycle test, and the thermal impact performance of the battery.

SUMMARY

An embodiment of the present application provides an electrolytic solution and an electrochemical device containing the electrolytic solution, so as to solve at least one of the problems existing in the related art to some extent. The electrolytic solution is characterized by comprising compounds having a —CN functional group. The electrolytic solution can significantly improve the floating-charge performance, the increased impedance under a long cycle, and the thermal impact performance of an electrochemical device using the same.

In an embodiment, the present application provides an electrolytic solution comprising compounds having a —CN functional group. The compounds having a —CN functional group comprise a first compound of structural Formula (I) and a second compound of structural Formula (II):

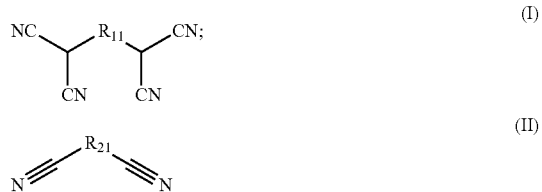

in which $R_{11}$ is selected from a substituted or unsubstituted alkylene group, a substituted or unsubstituted alkenylene group, a substituted or unsubstituted arylene group, and a substituted or unsubstituted cycloalkylene group, wherein when substituted, the substituent is one or more selected from halogen, an alkyl group or an alkenyl group; and $R_{21}$ is selected from a substituted or unsubstituted alkylene group, a substituted or unsubstituted alkenylene group, a substituted or unsubstituted arylene group, a substituted or unsubstituted $R_0$—S—R group, and a substituted or unsubstituted chain ether group, wherein $R_0$ and R are each independently a substituted or unsubstituted alkylene group, and wherein when substituted, the substituent is one or more selected from halogen, an alkyl group or an alkenyl group.

According to an embodiment of the present application, $R_{11}$ is selected from a substituted or unsubstituted $C_1$-$C_{20}$ alkylene group, a substituted or unsubstituted $C_2$-$C_{20}$ alkenylene group, a substituted or unsubstituted $C_6$-$C_{20}$ arylene group, and a substituted or unsubstituted $C_6$-$C_{20}$ cycloalkylene, wherein when substituted, the substituent is one or more selected from halogen, a $C_1$-$C_6$ alkyl group, or a $C_1$-$C_6$ alkenyl group; and $R_{21}$ is selected from a substituted or unsubstituted $C_1$-$C_{20}$ alkylene group, a substituted or unsubstituted $C_2$-$C_{20}$ alkenylene group, a substituted or unsubstituted $C_6$-$C_{20}$ arylene group, a substituted or unsubstituted $R_0$—S—R group, and a substituted or unsubstituted $C_2$-$C_{20}$ chain ether group, wherein $R_0$ and R are each independently a substituted or unsubstituted $C_1$-$C_{10}$ alkylene, and wherein when substituted, the substituent is one or more selected from halogen, a $C_1$-$C_6$ alkyl group or a $C_1$-$C_6$ alkenyl group.

According to an embodiment of the present application, $R_{11}$ is selected from a substituted or unsubstituted $C_1$-$C_{10}$ alkylene group, a substituted or unsubstituted $C_2$-$C_{10}$ alkenylene group, a substituted or unsubstituted $C_6$-$C_{10}$ arylene group, and a substituted or unsubstituted $C_6$-$C_{10}$ cycloalkylene, wherein when substituted, the substituent is fluorine; and $R_{21}$ is selected from a substituted or unsubstituted $C_1$-$C_{10}$ alkylene group, a substituted or unsubstituted $C_2$-$C_{10}$ alkenylene group, a substituted or unsubstituted $R_0$—S—R group, a substituted or unsubstituted $R_1$—O—$R_2$ group, and a substituted or unsubstituted $R_3$—O—$R_4$—O—$R_5$ group, wherein $R_0$, R, $R_1$, $R_2$, $R_3$, $R_4$, and $R_5$ are each independently a substituted or unsubstituted $C_1$-$C_4$ alkylene group, and wherein when substituted, the substituent is fluorine.

According to an embodiment of the present application, the first compound comprises one or more of the following compounds or is one or more selected from the following compounds:

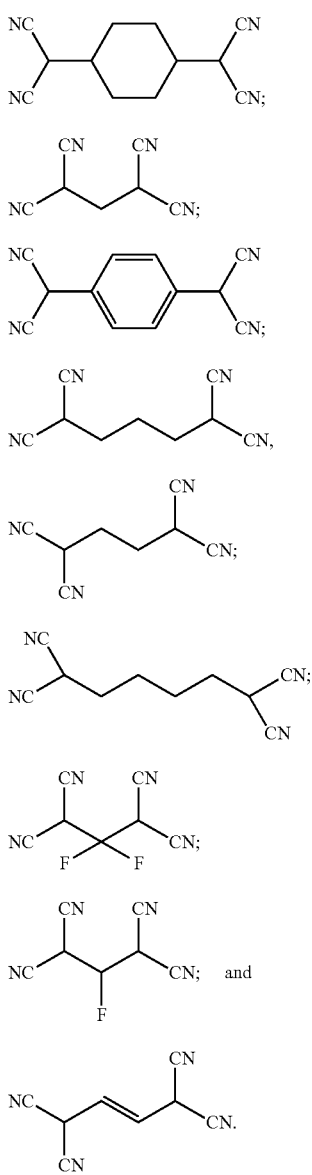

According to an embodiment of the present application, the second compound comprises one or more of the following compounds or is one or more selected from the following compounds:

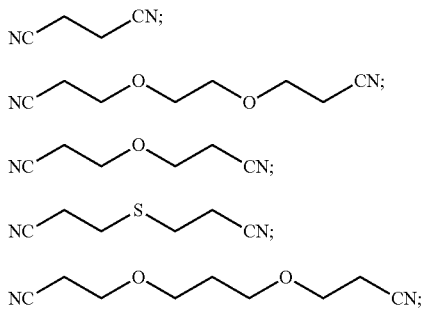

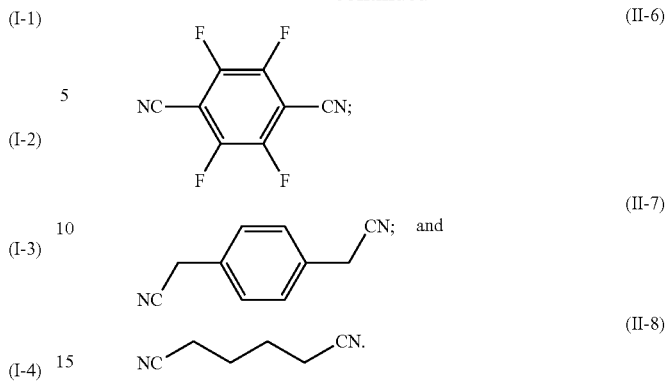

According to an embodiment of the present application, based on the total weight of the electrolytic solution, the percent by weight (X) of the first compound and the percent by weight (Y) of the second compound meet:

about 0.5 wt %≤(X+Y)≤about 30 wt %.

According to an embodiment of the present application, based on the total weight of the electrolytic solution, the percent by weight (X) of the first compound and the percent by weight (Y) of the second compound meet:

about 1 wt %≤(X+Y)≤about 15 wt %.

According to an embodiment of the present application, based on the total weight of the electrolytic solution, the percent by weight (X) of the first compound and the percent by weight (Y) of the second compound meet:

about 3.5 wt %≤(X+Y)≤about 15 wt %.

According to an embodiment of the present application, based on the total weight of the electrolytic solution, the percent by weight (X) of the first compound and the percent by weight (Y) of the second compound meet:

about 0.05≤(X/Y)≤about 10.

According to an embodiment of the present application, based on the total weight of the electrolytic solution, the percent by weight (X) of the first compound and the percent by weight (Y) of the second compound meet:

about 0.1≤(X/Y)≤about 3.

According to an embodiment of the present application, based on the total weight of the electrolytic solution, the percent by weight of the first compound (X) and the percent by weight of the second compound (Y) meet:

about 0.5 wt %≤(X+Y)≤about 30 wt %; and about 0.5≤(X/Y)≤about 10.

According to an embodiment of the present application, based on the total weight of the electrolytic solution, the percent by weight of the first compound (X) and the percent by weight of the second compound (Y) meet:

about 1 wt %≤(X+Y)≤about 15 wt %; and about 0.1≤(X/Y)≤about 3.

According to an embodiment of the present application, the electrolytic solution further comprises a compound having a sulfur-oxygen double bond. The compound having a sulfur-oxygen double bond comprises a compound of structural Formula (III-A) or a compound of structural Formula (III-B):

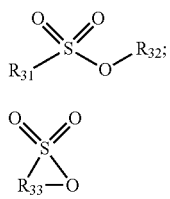
(III-A)

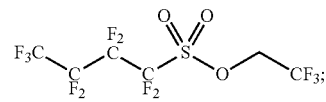
(III-1)

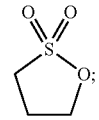
(III-B)

or a combination thereof;

wherein $R_{31}$ and $R_{32}$ are each independently selected from a substituted or unsubstituted alkyl group, a substituted or unsubstituted alkenyl group, a substituted or unsubstituted aryl group, or a substituted or unsubstituted heterocyclic group, wherein the heteroatom is one or more selected from O, S, and P, wherein when substituted, the substituent is one or more selected from halogen, nitro, cyano, carboxyl, or a sulfonic group; and $R_{33}$ is selected from a substituted or unsubstituted alkylene group, and a substituted or unsubstituted $C_2$-$C_{10}$ alkenylene group, wherein the alkylene group optionally contains a heteroatom, wherein the heteroatom is one or more selected from O, S, and P, and wherein when substituted, the substituent is one or more selected from halogen, an alkyl group or an alkenyl group.

According to an embodiment of the present application, $R_{31}$ and $R_{32}$ are each independently selected from a substituted or unsubstituted $C_1$-$C_{10}$ alkyl group, a substituted or unsubstituted $C_2$-$C_{10}$ alkenyl group, a substituted or unsubstituted $C_6$-$C_{10}$ aryl group, and a substituted or unsubstituted $C_1$-$C_{10}$ heterocyclic group, wherein the heteroatom is one or more selected from O, S, and P, wherein when substituted, the substituent is one or more selected from halogen, nitro, cyano, carboxyl, or a sulfonic group; and $R_{33}$ is selected from a substituted or unsubstituted $C_1$-$C_{10}$ alkylene group, and a substituted or unsubstituted $C_2$-$C_{10}$ alkenylene group, wherein the alkylene optionally contains a heteroatom, wherein the heteroatom is one or more selected from O, S, and P, and wherein when substituted, the substituent is one or more selected from halogen, a $C_1$-$C_{10}$ alkyl group, or a $C_2$-$C_{10}$ alkenyl group.

According to an embodiment of the present application, $R_{31}$ and $R_{32}$ are each independently selected from a substituted or unsubstituted $C_1$-$C_5$ alkyl group, a substituted or unsubstituted $C_2$-$C_{10}$ alkenyl group, a substituted or unsubstituted $C_6$-$C_{10}$ aryl group, and a substituted or unsubstituted $C_1$-$C_6$ heterocyclic group, wherein the heteroatom is one or more selected from O, S, and P, wherein when substituted, the substituent is one or more selected from halogen, nitro, cyano, carboxyl, and a sulfonic group; and $R_{33}$ is selected from a substituted or unsubstituted $C_1$-$C_6$ alkylene group, and a substituted or unsubstituted $C_2$-$C_4$ alkenylene group, wherein the $C_1$-$C_6$ alkylene optionally contains a heteroatom, wherein the heteroatom is one or more selected from O, S, and P, and wherein when substituted, the substituent is selected from halogen, a $C_1$-$C_3$ alkyl group, or a $C_2$-$C_4$ alkenyl group.

According to an embodiment of the present application, the compound having a sulfur-oxygen double bond comprises one or more of the following compounds or is one or more selected from the following compounds:

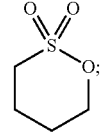
(III-2)

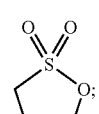
(III-3)

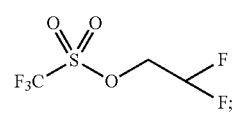
(III-4)

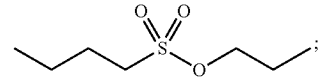
(III-5)

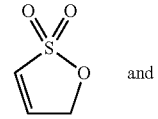
(III-6)

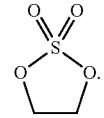
(III-7)
and

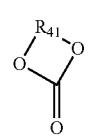
(III-8)

According to an embodiment of the present application, based on the total weight of the electrolytic solution, the content of the compound having a sulfur-oxygen double bond is about 0.01 wt % to about 30 wt %.

According to an embodiment of the present application, based on the total weight of the electrolytic solution, the content of the compound having a sulfur-oxygen double bond is about 0.1 wt % to about 10 wt %.

According to an embodiment of the present application, based on the total weight of the electrolytic solution, the content of the compound having a sulfur-oxygen double bond is about 0.1 wt % to about 5 wt %.

According to an embodiment of the present application, the electrolytic solution may further comprise a cyclic carbonate ester of structural Formula IV:

(IV)

in which $R_{41}$ is selected from a substituted or unsubstituted alkylene group, and a substituted or unsubstituted $C_2$-$C_{10}$ alkenylene, wherein when substituted, the substituent is one or more selected from halogen, a $C_1$-$C_6$ alkyl group, or a $C_2$-$C_6$ alkenyl group.

According to an embodiment of the present application, $R_{41}$ is selected from a substituted or unsubstituted $C_1$-$C_{10}$ alkylene group, and a substituted or unsubstituted $C_2$-$C_{10}$ alkenylene, wherein when substituted, the substituent is one or more selected from halogen, a $C_1$-$C_6$ alkyl group, or a $C_2$-$C_6$ alkenyl group.

According to an embodiment of the present application, $R_{41}$ is selected from a substituted or unsubstituted $C_1$-$C_6$ alkylene group, and a substituted or unsubstituted $C_2$-$C_6$ alkenylene, wherein when substituted, the substituent is one or more selected from halogen, a $C_1$-$C_6$ alkyl group, or a $C_2$-$C_6$ alkenyl group.

According to an embodiment of the present application, the cyclic carbonate ester comprises one or more of the following compounds or is one or more selected from the following compounds:

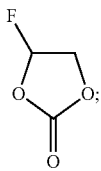
(IV-1)

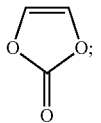
(IV-2)

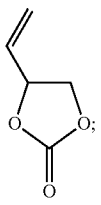
(IV-3)

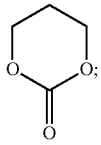
(IV-4)

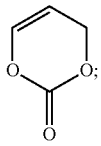
(IV-5)

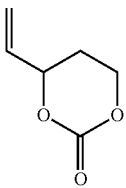
(IV-6)
and

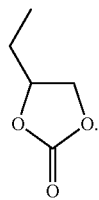
(IV-7)

According to an embodiment of the present application, based on the total weight of the electrolytic solution, the content of the cyclic carbonate ester is about 0.01 wt % to about 50 wt %.

According to an embodiment of the present application, based on the total weight of the electrolytic solution, the content of the cyclic carbonate ester is about 0.1 wt % to about 30 wt %.

According to an embodiment of the present application, the electrolytic solution may further comprise a carboxylate ester of structural Formula V:

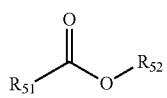
(V)

in which $R_{51}$ and $R_{52}$ are each independently selected from a substituted or unsubstituted alkylene group, and a substituted or unsubstituted alkenylene, wherein when substituted, the substituent is one or more selected from halogen, a $C_1$-$C_6$ alkyl group or a $C_2$-$C_6$ alkenyl group.

According to an embodiment of the present application, $R_{51}$ and $R_{52}$ are each independently selected from a substituted or unsubstituted $C_1$-$C_{10}$ alkylene group, and a substituted or unsubstituted $C_2$-$C_{10}$ alkenylene, wherein when substituted, the substituent is one or more selected from halogen, a $C_1$-$C_6$ alkyl group, or a $C_2$-$C_6$ alkenyl group.

According to an embodiment of the present application, $R_{51}$ and $R_{52}$ are each independently selected from a substituted or unsubstituted $C_1$-$C_6$ alkylene group, and a substituted or unsubstituted $C_2$-$C_6$ alkenylene, wherein when substituted, the substituent is one or more selected from halogen, a $C_1$-$C_6$ alkyl group, or a $C_2$-$C_6$ alkenyl group.

According to an embodiment of the present application, the carboxylate ester comprises one or more of the following compounds or is one or more selected from the following compounds:

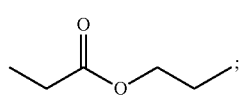
(V-1)

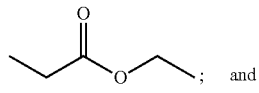
(V-2)
and

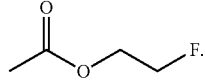
(V-3)

According to an embodiment of the present application, based on the total weight of the electrolytic solution, the content of the carboxylate ester is about 0.01 wt % to about 60 wt %.

According to an embodiment of the present application, based on the total weight of the electrolytic solution, the content of the carboxylate ester is about 0.01 wt % to about 40 wt %.

According to an embodiment of the present application, based on the total weight of the electrolytic solution, the content of the carboxylate is about 5 wt % to about 20 wt %.

In another embodiment of the present invention, the present application provides an electrochemical device comprises a cathode, an anode, a separator disposed between the cathode and the anode, and an electrolytic solution according to an embodiment of the present application.

According to an embodiment of the present application, the cathode comprises a cathode current collector and a cathode film coated on the cathode current collector; and the anode comprises a anode current collector and a anode film coated on the anode current collector. The cathode film comprises a cathode active material, wherein the cathode active material comprises one or more of: lithium cobaltate, a ternary material, lithium iron phosphate, lithium manganate or any combination thereof, and wherein the ternary material comprises one or more of: a lithium nickel cobalt manganese oxide or a lithium nickel cobalt aluminum oxide.

According to an embodiment of the present application, the cathode active material comprises a mixture of lithium cobaltate and a lithium nickel cobalt manganese oxide.

According to an embodiment of the present application, the lithium nickel cobalt manganese oxide includes one or more of or is one or more selected from: $Li[Ni_{1/3}Co_{1/3}Mn_{1/3}]O_2$; $Li[Ni_{0.4}Co_{0.4}Mn_{0.2}]O_2$; $Li[Ni_{0.5}Co_{0.2}Mn_{0.3}]O_2$; $Li[Ni_{0.6}Co_{0.2}Mn_{0.2}]O_2$; $Li[Ni_{0.7}Co_{0.15}Mn_{0.15}]O_2$; $Li[Ni_{0.8}Co_{0.1}Mn_{0.1}]O_2$; or $Li[Ni_{0.85}Co_{0.075}Mn_{0.075}]O_2$.

According to an embodiment of the present application, the lithium nickel cobalt aluminum oxide includes $Li[Ni_{0.8}Co_{0.15}Al_{0.05}]O_2$.

According to an embodiment of the present application, the ratio of lithium cobaltate to the lithium nickel cobalt manganese oxide is about 1:9-9:1.

According to an embodiment of the present application, the ratio of lithium cobaltate to the lithium nickel cobalt manganese oxide is about 2:8-4:6.

In another embodiment of the present application, the present application provides an electronic device including the electrochemical device.

Additional aspects and advantages of the embodiments of the present application will be partially described, illustrated or explained by way of examples in the description as follows.

DETAILED DESCRIPTION

Embodiments of the present application will be described in detail below. The embodiments of the present application should not be interpreted as limitations to the present application.

As used herein, the terms "include", "comprise" and "contain" are used in their open, non-limiting sense.

The term "about" is used to describe and illustrate small changes. When used in connection with an event or circumstance, the term may refer to an example in which the event or circumstance occurs precisely, and an example in which the event or circumstance occurs approximately. For example, when used in connection with a value, the term may refer to a range of variation less than or equal to ±10% of the said value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other values are sometimes presented in a range format in this application. It is to be understood that such a range format is provided for convenience and simplicity, and should be understood flexibly to include not only the numerical values that are explicitly defined in the range, but also all the individual values or sub-ranges that are included in the range, as if each value and sub-range are explicitly specified.

The present application relates to an electrolytic solution comprising an organic solvent, a lithium salt, and additives. The organic solvent used in the electrolytic solution according to the present application may be any organic solvent known in the art as a solvent for an electrolytic solution. The electrolyte used in the electrolytic solution according to the present application is not limited, and may be any electrolyte known in the art.

In some embodiments, the organic solvent used in the electrolytic solution of the present application includes or is selected from: ethylene carbonate (EC), propylene carbonate (PC), diethyl carbonate (DEC), ethyl methyl carbonate (EMC), and dimethyl carbonate (DMC).

In some embodiments, the lithium salt used in the present application includes at least one of or is at least one selected from an organic lithium salt or an inorganic lithium salt. In some embodiments, the lithium salt used in the present application contains at least one of fluorine element, boron element, and phosphorus element.

In some embodiments, the lithium salt used in the present application includes at least one of or is at least one selected from: lithium hexafluorophosphate ($LiPF_6$), lithium tetrafluoroborate ($LiBF_4$), lithium difluorophosphate ($LiPO_2F_2$), lithium bis(trifluoromethanesulphonyl)imide $LiN(CF_3SO_2)_2$ (LiTFSI), lithium bis(fluorosulfonyl)imide $Li(N(SO_2F)_2$ (LiFSI), lithium bis(oxalato)borate $LiB(C_2O_4)_2$ (LiBOB), and lithium difluoro(oxalato)borate $LiBF_2(C_2O_4)$ (LiDFOB).

In some embodiments, the concentration of the lithium salt in the electrolytic solution of the present application is about 0.5-3 mol/L, about 0.5-2 mol/L, or about 0.8-1.5 mol/L.

The additives include compounds having a —CN functional group. The present application has found through extensive research that the compound containing a —CN functional group can form a nitrile protective film having excellent performance on the surface of a cathode active material. Meanwhile, the nitrogen element in the nitrile compound is an electron-rich group, which can better stabilize the transition metal cobalt in the cathode material. Moreover, the protective effect of the nitrile compound directly correlates with its dosage to some extent.

The inventors of the present application also found that when a nitrile compound of a single structure containing two or more —CN functional groups is used, the dynamic performance of a battery is affected due to the large viscosity of said nitrile compounds. Moreover, the improvement of the effect is not great when using a nitrile compound of a single structure because the film forming component is relatively homogeneous. Using a combination of different nitrile compounds can remedy the kinetic deficiency caused by using a large amount of a single nitrile compound on the one hand, and allows for the better exertion of the characteristics of the additives on the other hand.

The present application provides an electrolytic solution which includes a nitrile compound containing four —CN functional groups (hereinafter referred to as a "tetranitrile compound") and a nitrile compound containing two —CN functional groups (hereinafter referred to as a "dinitrile compound"). The addition of the tetranitrile compound well remedies the deficiency of inconspicuous effects caused by less functional groups, and the addition of the dinitrile compound remedies the film forming deficiency caused by the steric hindrance of the tetranitrile compound. In some embodiments, the electrolytic solution of the present application can improve the floating-charge performance, the increased impedance under a long cycle, and the thermal impact performance of an electrochemical device.

In some embodiments, the compounds having a —CN functional group include or are selected from compounds of Formulae I and II:

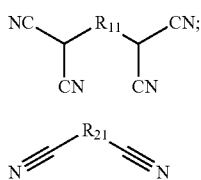

in which $R_{11}$ is selected from a substituted or unsubstituted alkylene group, a substituted or unsubstituted alkenylene group, a substituted or unsubstituted arylene group, and a substituted or unsubstituted cycloalkylene group, wherein when substituted, the substituent is one or more selected from halogen, an alkyl group or an alkenyl group; and $R_{21}$ is selected from a substituted or unsubstituted alkylene group, a substituted or unsubstituted alkenylene group, a substituted or unsubstituted arylene group, a substituted or unsubstituted $R_0$—S—R group, and a substituted or unsubstituted chain ether group, where $R_0$ and R are each independently a substituted or unsubstituted alkylene group, and wherein when substituted, the substituent is one or more selected from halogen, an alkyl group or an alkenyl group.

In some embodiments, $R_{11}$ is selected from a substituted or unsubstituted $C_1$-$C_{20}$ alkylene group, a substituted or unsubstituted $C_2$-$C_{20}$ alkenylene group, a substituted or unsubstituted $C_6$-$C_{20}$ arylene group, and a substituted or unsubstituted $C_6$-$C_{20}$ cycloalkylene, wherein when substituted, the substituent is one or more selected from halogen, a $C_1$-$C_6$ alkyl group or a $C_1$-$C_6$ alkenyl group; and $R_{21}$ is selected from a substituted or unsubstituted $C_1$-$C_{20}$ alkylene group, a substituted or unsubstituted $C_2$-$C_{20}$ alkenylene group, a substituted or unsubstituted $C_6$-$C_{20}$ arylene group, a substituted or unsubstituted $R_0$—S—R group, and a substituted or unsubstituted $C_2$-$C_{20}$ chain ether group, wherein $R_0$ and R are each independently a substituted or unsubstituted $C_1$-$C_{10}$ alkylene, and wherein when substituted, the substituent is one or more selected from halogen, a $C_1$-$C_6$ alkyl group, or a $C_1$-$C_6$ alkenyl group.

In some embodiments, $R_{11}$ is selected from a substituted or unsubstituted $C_1$-$C_{10}$ alkylene group, a substituted or unsubstituted $C_2$-$C_{10}$ alkenylene group, a substituted or unsubstituted $C_6$-$C_{10}$ arylene group, and a substituted or unsubstituted $C_6$-$C_{10}$ cycloalkylene, wherein when substituted, the substituent is fluorine; and $R_{21}$ is selected from a substituted or unsubstituted $C_1$-$C_{10}$ alkylene group, a substituted or unsubstituted $C_2$-$C_{10}$ alkenylene group, a substituted or unsubstituted $R_0$—S—R group, a substituted or unsubstituted $R_1$—O—$R_2$ group, and a substituted or unsubstituted $R_3$—O—$R_4$—O—$R_5$ group, where $R_0$, R, $R_1$, $R_2$, $R_3$, $R_4$, and $R_5$ are each independently a substituted or unsubstituted $C_1$-$C_4$ alkylene group, and wherein when substituted, the substituent is fluorine.

In some embodiments, the nitrile compound having four —CN functional groups of the present application includes one or more of following compounds or is one or more selected from the following compounds:

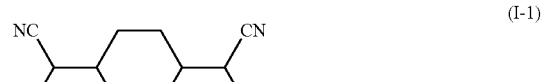

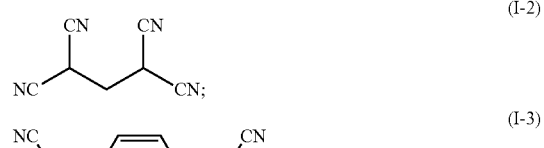

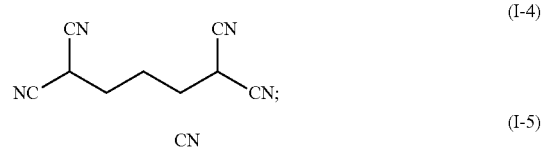

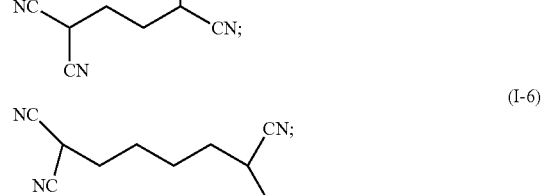

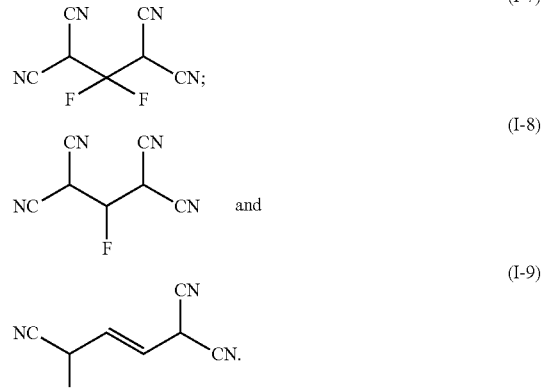

In some embodiments, the nitrile compound having two —CN functional groups of the present application includes one or more of the following compounds or is one or more of the following compounds:

-continued

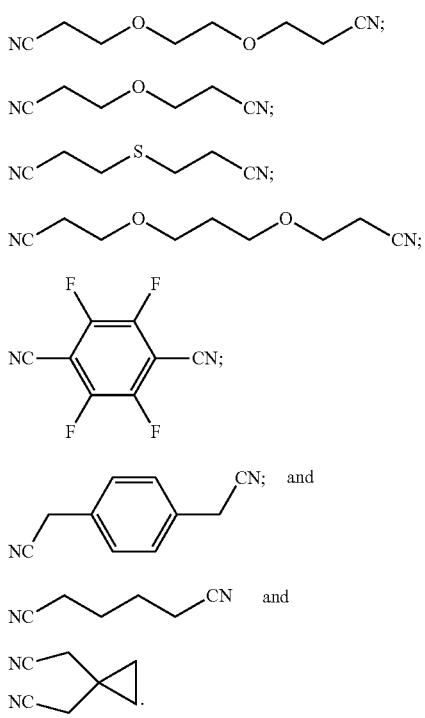

(II-2) (II-3) (II-4) (II-5) (II-6) (II-7) (II-8) (II-9)

In some embodiments, the tetranitrile compound and the dinitrile compound may be added at a certain ratio. For example, based on the total weight of the electrolytic solution, the percent by weight (X) of the tetranitrile compound and the percent by weight (Y) of the dinitrile compound meet: about 0.5 wt %≤(X+Y)≤about 30 wt %, about 0.5 wt %≤(X+Y)≤about 25 wt %, about 1 wt %≤(X+Y)≤about 25 wt %, about 3 wt %≤(X+Y)≤about 20 wt %, about 1 wt %≤(X+Y)≤about 15 wt %, about 3 wt %≤(X+Y)≤about 15 wt %, about 3 wt %≤(X+Y)≤about 13 wt %, about 3 wt %≤(X+Y)≤about 12 wt %, about 3 wt %≤(X+Y)≤about 10 wt %, about 3.5 wt %≤(X+Y)≤about 10 wt %, about 3.5 wt %≤(X+Y)≤about 9 wt %, or about 4 wt %≤(X+Y)≤about 8 wt %.

In some embodiments, based on the total weight of the electrolytic solution, when the sum of the percent by weight (X) of the tetranitrile compound and the percent by weight (Y) of the dinitrile compound meets the ranges defined above, the ratio of X/Y optionally further meets: about 0.05≤(X/Y)≤about 10, about 0.05≤(X/Y)≤about 9, about 0.06≤(X/Y)≤about 8, about 0.1≤(X/Y)≤about 8, about 0.05≤(X/Y)≤about 10, about 0.05≤(X/Y)≤about 8, about 0.05≤(X/Y)≤about 7, about 0.05≤(X/Y)≤about 6, about 0.05≤(X/Y)≤about 5, about 0.1≤(X/Y)≤about 5, about 0.1≤(X/Y)≤about 3, about 0.1≤(X/Y)≤about 2, or about 0.1≤(X/Y)≤about 1.

In some embodiments, the percent by weight (X) of the tetranitrile compound and the percent by weight (Y) of the dinitrile compound simultaneously meet conditions represented by one of Formulae (1) and one of Formulae (2) below:

about 0.5 wt %≤(X+Y)≤about 30 wt %            (1);

about 1 wt %≤(X+Y)≤about 15 wt %             (1);

about 1 wt %≤(X+Y)≤about 10 wt %             (1);

about 3.5 wt %≤(X+Y)≤about 15 wt %           (1); or about 3.5 wt %≤(X+Y)≤about 10 wt %           (1); and about 0.5≤(X/Y)≤about 10                      (2);

about 0.05≤(X/Y)≤about 5                      (2);

about 0.1≤(X/Y)≤about 3                       (2); or about 0.05≤(X/Y)≤about 10                     (2).

In some embodiments, the electrolytic solution of the present application optionally comprises a compound having a sulfur-oxygen double bond, so as to further enhance the protection for the active material. The compound having a sulfur-oxygen double bond includes or is selected from a compound of structural Formula (III-A) or a compound of structural Formula (III-B):

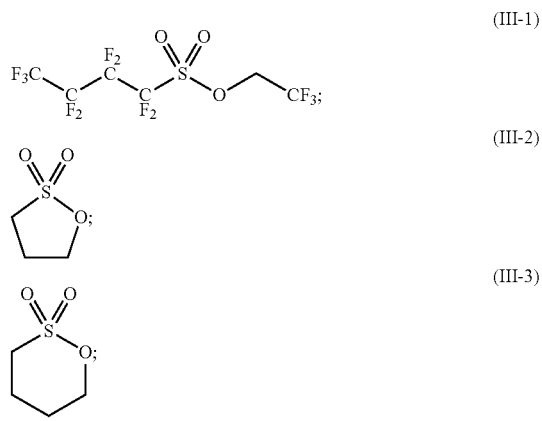

(III-A)

(III-B)

or a combination thereof, in which $R_{31}$ and $R_{32}$ are each independently selected from a substituted or unsubstituted alkyl group, a substituted or unsubstituted alkenyl group, a substituted or unsubstituted aryl group, and a substituted or unsubstituted heterocyclic group, wherein heteroatom is selected from O, S, and P, wherein when substituted, the substituent is one or more selected from halogen, nitro, cyano, carboxyl, or a sulfonic group; and $R_{33}$ is selected from a substituted or unsubstituted alkylene group, and a substituted or unsubstituted $C_2$-$C_{10}$ alkenylene group, wherein the alkylene optionally contains a heteroatom, wherein the heteroatom is one or more selected from O, S, and P, and wherein when substituted, the substituent is one or more selected from halogen, an alkyl group, or an alkenyl group.

In some embodiments, the compound having a sulfur-oxygen double bond includes one or more of the following compounds or is one or more selected from the following compounds, but not limited to:

(III-1) (III-2) (III-3)

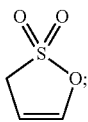
(III-4)

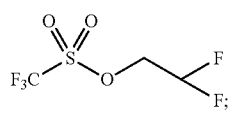
(III-5)

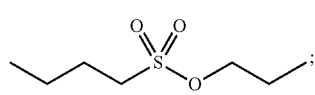
(III-6)

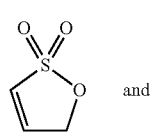 and
(III-7)

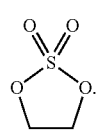
(III-8)

In some embodiments, based on the total weight of the electrolytic solution, the content of the compound having a sulfur-oxygen double bond in the present application is about 0.01-10 wt %. When the content is less than 0.01 wt %, an intact and effective protective film cannot be formed on the surface of the cathode and anode, so that side reactions caused by electron transfer between the electrolytic solution and the electrodes cannot be effectively prevented. When the content is greater than 10 wt %, the transport of lithium ions in organic films will be hindered due to the increase of the film thickness, which is disadvantageous for the lithium ion deintercalation during the cycle, thereby causing more side reactions, resulting in increased post-cycle impedance.

In some embodiments, based on the total weight of the electrolytic solution, the content of the compound having a sulfur-oxygen double bond in the present application is not greater than about 10 wt %, not greater than about 5 wt %, not greater than about 4 wt %, not greater than about 3 wt %, not greater than about 2.0 wt %, not greater than about 1.5 wt %, or not greater than about 1.0 wt %. In some embodiments, the content of the compound having a sulfur-oxygen double bond in the present application is not less than about 0.01 wt %, not less than about 0.1 wt %, not less than about 0.3 wt %, not less than about 0.5 wt %, or not less than about 0.6 wt %. In some embodiments, the content of the compound having a sulfur-oxygen double bond is about 0.01 wt %-about 30 wt %, about 0.01 wt %-about 8 wt %, about 0.1 wt %-about 10 wt %, about 0.1 wt %-about 8 wt %, about 0.1 wt %-about 7 wt %, about 0.1 wt %-about 5 wt %, about 0.1 wt %-about 4 wt %, about 1 wt %-about 5 wt %, about 2 wt %-about 5 wt %, or about 1 wt %-about 3 wt %.

In some embodiments, the electrolytic solution of the present application optionally comprises a cyclic carbonate ester compound as an additive for forming solid electrolyte interface (SEI) film, so as to further facilitate the enhancement of the stability of the SEI film. The use of the cyclic carbonate ester can increase the flexibility of the SEI film, further increase the protection for the active material, and reduce the probability of the active material contacting with the electrolytic solution at the interface, thereby alleviating the impedance increase caused by the accumulation of by-products during the cycle.

In some embodiments, the cyclic carbonate ester has a structure of Formula IV:

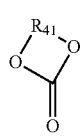
(IV)

in which $R_{41}$ is selected from a substituted or unsubstituted alkylene group, and a substituted or unsubstituted $C_2$-$C_{10}$ alkenylene, wherein when substituted, the substituent is one or more selected from halogen, a $C_1$-$C_6$ alkyl group, or a $C_2$-$C_6$ alkenyl group.

According to an embodiment of the present application, $R_{41}$ is selected from a substituted or unsubstituted $C_1$-$C_{10}$ alkylene group, and a substituted or unsubstituted $C_2$-$C_{10}$ alkenylene, wherein when substituted, the substituent is one or more selected from halogen, a $C_1$-$C_6$ alkyl group, or a $C_2$-$C_6$ alkenyl group.

According to an embodiment of the present application, $R_{41}$ is selected from a substituted or unsubstituted $C_1$-$C_6$ alkylene group, and a substituted or unsubstituted $C_2$-$C_6$ alkenylene, wherein when substituted, the substituent is one or more selected from halogen, a $C_1$-$C_6$ alkyl group, or a $C_2$-$C_6$ alkenyl group.

In some embodiments, the cyclic carbonate ester compound includes one or more of the following compounds or is one or more selected from the following compounds:

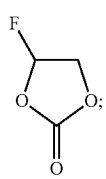
(IV-1)

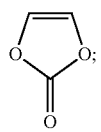
(IV-2)

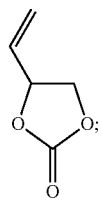
(IV-3)

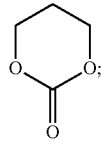
(IV-4)

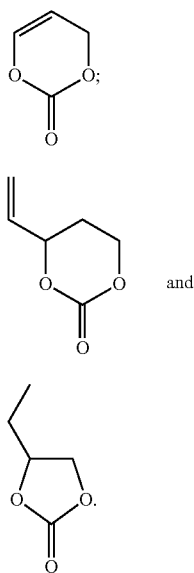

In some embodiments, based on the total weight of the electrolytic solution, the content of the cyclic carbonate ester is about 0.01 wt %-about 50 wt %, about 2 wt %-about 40 wt %, about 1 wt %-about 40 wt %, about 0.01 wt %-about 40 wt %, about 5 wt %-about 40 wt %, about 5 wt %-about 35 wt %, about 5 wt %-about 25 wt %, about 1 wt %-about 20 wt %, about 1 wt %-about 15 wt %, about 0.1 wt %-about 30 wt %, about 0.1 wt %-about 10 wt %, or about 0.1 wt %-about 5 wt %.

In some embodiments, the electrolytic solution of the present application optionally comprises a carboxylate ester. The use of a carboxylate of low viscosity in combination with the carbonate ester system can improve the wettability of the electrolytic solution, increase the amount of the additive at the surface of the active material, and enhance the film forming effect of the additive on the surface of the active material.

In some embodiments, the carboxylate ester has a structure of Formula V:

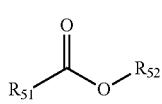

in which $R_{51}$ and $R_{52}$ are each independently selected from a substituted or unsubstituted alkylene group, and a substituted or unsubstituted alkenylene, wherein when substituted, the substituent is one or more selected from halogen, a $C_1$-$C_6$ alkyl group or a $C_2$-$C_6$ alkenyl group.

In some embodiments, the carboxylate ester includes one or more of the following compounds or is one or more selected from the group consisting of:

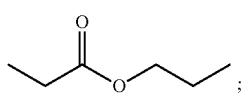

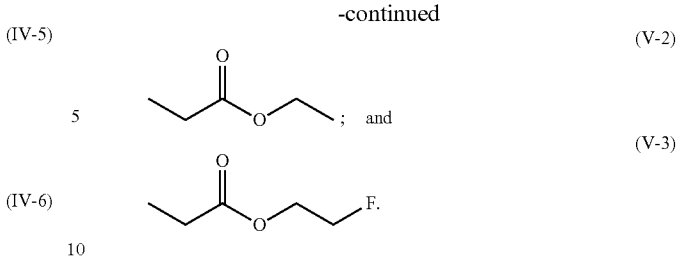

In some embodiments, based on the total weight of the electrolytic solution, the content of the carboxylate is about 0.01 wt %-about 60 wt %, about 1 wt %-about 50 wt %, about 5 wt %-about 50 wt %, about 5 wt %-about 45 wt %, about 0.01 wt %-about 40 wt %, about 0.01 wt %-about 30 wt %, about 0.01 wt %-about 20 wt %, about 0.01 wt %-about 10 wt %, about 5 wt %-about 20 wt %, or about 5 wt %-about 10 wt %.

The present application further relates to an electrochemical device. The electrochemical device of the present invention includes any device in which an electrochemical reaction occurs, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery. In some embodiments, the electrochemical device of the present application includes a cathode having a cathode active material capable of absorbing and releasing metal ions; a anode having a anode active material capable of absorbing and releasing metal ions; and an electrolytic solution of the present application.

In some embodiments, the electrochemical device of present application comprises a cathode, an anode, a separator disposed between the cathode and the plate, and an electrolytic solution according to any of the preceding embodiments of the present application.

In some embodiments, the electrochemical device of present application comprises a cathode, an anode, a separator disposed between the cathode and the anode, an electrolytic solution, and a packaging foil. The cathode includes a cathode current collector and a cathode film coated on the cathode current collector, and the anode includes a anode current collector and a anode film coated on the anode current collector. The electrolytic solution is an electrolytic solution according to any of the preceding embodiments.

In some embodiments, the separator of the present application includes a substrate layer and a surface treatment layer; and the substrate layer is a nonwoven fabric, a film or a composite film having a porous structure.

In some embodiments, the material of the substrate layer includes at least one of or is at least one selected from polyethylene, polypropylene, polyethylene terephthalate, and polyimide.

In some embodiments, the separator of the present application may be selected from a porous polypropylene film, a porous polyethylene film, a polypropylene nonwoven fabric, a polyethylene nonwoven fabric, and a porous polypropylene-polyethylene-polypropylene composite film.

In some embodiments, at least one surface of the substrate layer is provided with a surface treatment layer, and said surface treatment layer may be a polymer layer or an inorganic layer, or a layer formed by mixing a polymer and inorganics.

In some embodiments, the cathode film of the present application comprises a cathode active material, a binder and a conductive agent.

In some embodiments, the cathode active material of the present application includes one or more of or is one or more selected from: lithium cobaltate, a ternary material, lithium iron phosphate, lithium manganate or any combination thereof.

In some embodiments, the ternary material includes or is selected from: a lithium nickel cobalt manganese oxide $LiNi_xCo_yMn_{1-x-y}O_2$ or a lithium nickel cobalt aluminum oxide $LiNi_xCo_yAl_{1-x-y}O_2$, or a combination thereof, wherein about $0.2 \leq x \leq$ about $0.9$, and about $0.04 \leq y \leq$ about $0.5$.

In some embodiments, the lithium nickel cobalt manganese oxide includes one or more of or is one or more selected from the group consisting of:

$Li[Ni_{1/3}Co_{1/3}Mn_{1/3}]O_2$; $Li[Ni_{0.4}Co_{0.4}Mn_{0.2}]O_2$;
$Li[Ni_{0.5}Co_{0.2}Mn_{0.3}]O_2$; $Li[Ni_{0.6}Co_{0.2}Mn_{0.2}]O_2$;
$Li[Ni_{0.7}Co_{0.15}Mn_{0.15}]O_2$; $Li[Ni_{0.8}Co_{0.1}Mn_{0.1}]O_2$;
$Li[Ni_{0.85}Co_{0.075}Mn_{0.075}]O_2$; $Li[Ni_{0.6}Co_{0.2}Mn_{0.2}]O_2$; or any combination thereof.

In some embodiments, the lithium nickel cobalt aluminum oxide includes $Li[Ni_{0.8}Co_{0.15}Al_{0.05}]O_2$.

In some embodiments, the cathode active material of the present application includes or is selected from a mixture of a lithium cobaltate and a lithium nickel cobalt manganese oxide. The combination of lithium cobaltate with a lithium nickel cobalt manganese oxide can improve the safety performance of the material. Moreover, since the amount of transition metals is increased after they are mixed, the transition metals have a catalytic effect on the film formation of the electrolytic solution, which can make the additives have a more potent film forming effect.

In some embodiments, the ratio of lithium cobaltate to the lithium nickel cobalt manganese oxide is about 1:9-9:1, about 2:8-8:2, about 3:7-7:3, about 4:6-6:4, or about 5:5.

In some embodiments, the anode film of the present application comprises an anode active material, a binder, and a conductive agent.

In some embodiments, the anode active material of the present application includes or is selected from graphite, silicon or a blend thereof.

As used therein, the "alkyl group" covers both linear and branched alkyl groups. For example, the alkyl group may be a $C_1$-$C_{50}$ alkyl group, a $C_1$-$C_{40}$ alkyl group, a $C_1$-$C_{30}$ alkyl group, $C_1$-$C_{20}$ alkyl group, a $C_1$-$C_{10}$ alkyl group, a $C_1$-$C_6$ alkyl group, a $C_2$-$C_6$ alkyl group, or a $C_2$-$C_5$ alkyl group. In some embodiments, the alkyl group includes methyl, ethyl, propyl, isopropyl, butyl, isobutyl, tert-butyl, pentyl, hexyl, heptyl, octyl and the like. Additionally, the alkyl group can be optionally substituted.

As used herein, the term "alkylene group" covers both linear and branched alkylene groups. For example, the alkylene group may be a $C_1$-$C_{50}$ alkylene group, a $C_1$-$C_{40}$ alkylene group, a $C_1$-$C_{30}$ alkylene group, a $C_1$-$C_{20}$ alkylene group, a $C_1$-$C_{10}$ alkylene group, a $C_1$-$C_6$ alkylene group, a $C_2$-$C_6$ alkylene group, or a $C_2$-$C_5$ alkylene. Additionally, the alkylene group can be optionally substituted.

As used herein, the term "alkenylene group" covers both linear and branched alkenylene groups. For example, the alkenylene group may be a $C_2$-$C_{50}$ alkenylene group, a $C_2$-$C_{40}$ alkenylene group, a $C_2$-$C_{30}$ alkenylene group, a $C_2$-$C_{20}$ alkenylene group, a $C_2$-$C_{10}$ alkenylene group, a $C_2$-$C_6$ alkenylene group, or a $C_2$-$C_6$ alkenylene. Additionally, the alkenylene group can be optionally substituted.

As used herein, the term "cycloalkylene group" covers cyclic alkylene groups. In some embodiments, the cycloalkylene group may be a $C_3$-$C_{50}$ cycloalkylene group, a $C_3$-$C_{40}$ cycloalkylene group, a $C_3$-$C_{30}$ cycloalkylene group, a $C_3$-$C_{20}$ cycloalkylene group, a $C_6$-$C_{20}$ cycloalkylene group, a $C_3$-$C_{10}$ cycloalkylene group, or a $C_3$-$C_6$ cycloalkylene. For example, the cycloalkylene group may be cyclopropylene, cyclopentylene, cyclohexylene, and the like. Additionally, the cycloalkylene group can be optionally substituted.

As used herein, the term "aryl" covers both monocyclic and polycyclic systems. A polycyclic ring may have two or more rings in which two carbons are shared by two adjacent rings (where the rings are "fused"), in which at least one of the rings is aromatic and other rings may be for example, a cycloalkyl group, a cycloalkenyl group, an aryl group, a heterocyclyl group and/or a heteroaryl group. For example, the aryl group may be a $C_6$-$C_{50}$ aryl group, a $C_6$-$C_{40}$ aryl group, a $C_6$-$C_{30}$ aryl group, a $C_6$-$C_{20}$ aryl group, or a $C_6$-$C_{10}$ aryl group. Additionally, the aryl group can be optionally substituted.

As used herein, the term "arylene" covers both monocyclic and polycyclic systems. A polycyclic ring may have two or more rings in which two carbons are shared by two adjacent rings (where the rings are "fused"), in which at least one of the rings is aromatic and other rings may be a cycloalkyl group, a cycloalkenyl group, an aryl group, a heterocyclyl group and/or a heteroaryl group. For example, the arylene group may be a $C_6$-$C_{50}$ arylene group, a $C_6$-$C_{40}$ arylene group, a $C_6$-$C_{30}$ arylene group, a $C_6$-$C_{20}$ arylene, or a $C_6$-$C_{10}$ arylene. Additionally, the arylene group can be optionally substituted.

As used herein, the term "heteroaryl group" covers a monocyclic heteroaromatic group which may include one to three heteroatoms, for example, pyrrole, furan, thiophene, imidazole, oxazole, thiazole, triazole, pyrazole, pyridine, pyrazine, pyrimidine, and the like. The term heteroaryl group also includes a polycyclic heteroaromatic system having two or more rings in which two atoms are shared by two adjacent rings (where the ring is "fused"), in which at least one of the rings is a heteroaryl group, and other rings may be a cycloalkyl group, a cycloalkenyl group, an aryl group, a heterocyclyl group and/or a heteroaryl group. For example, the heteroaryl group may be a $C_2$-$C_{50}$ heteroaryl group, a $C_2$-$C_{40}$ heteroaryl group, a $C_2$-$C_{30}$ heteroaryl group, a $C_2$-$C_{20}$ heteroaryl group, or a $C_2$-$C_{10}$ heteroaryl group. Additionally, the heteroaryl group can be optionally substituted.

As used herein, the term "heterocyclic group" covers both aromatic and non-aromatic cyclic groups. Heteroaromatic cyclic groups also mean heteroaryl groups. In some embodiments, the heteroaromatic cyclic group and hetero-non-aromatic cyclic group include a $C_1$-$C_{50}$ heterocyclyl group, $C_1$-$C_{40}$ heterocyclyl group, $C_1$-$C_{30}$ heterocyclyl group, $C_1$-$C_{20}$ heterocyclyl group, $C_1$-$C_{10}$ heterocyclyl group, or a $C_1$-$C_6$ heterocyclyl group, which has at least one heteroatom. For example, morpholinyl, piperidinyl, pyrrolidinyl, and cyclic ethers, for example, tetrahydrofuran, tetrahydropyran, and the like. Additionally, the heterocyclic group can be optionally substituted.

As used herein, the term "heteroatom" covers O, S, P, N, B or their isosteres.

As used herein, the term "chain ether group" may be a $C_2$-$C_{50}$ chain ether group, a $C_2$-$C_{40}$ chain ether group, a $C_2$-$C_{30}$ chain ether group, a $C_2$-$C_{20}$ chain ether group, a $C_6$-$C_{20}$ chain ether group, a $C_2$-$C_{10}$ chain ether group, or a $C_2$-$C_6$ chain ether group.

When the above substituents are substituted, the substituent is selected from the group consisting of: halogen, an alkyl group, a cycloalkyl group, an alkenyl group, an aryl group, a heteroaryl group, nitro, cyano, carboxyl, and a sulfonic group.

As used herein, the term "halogen" may be F, Cl, Br or I.

As used herein, the term "cyano" may be a $C_1$-$C_{50}$ cyano group, a $C_1$-$C_{40}$ cyano group, a $C_1$-$C_{30}$ cyano group, a $C_1$-$C_{20}$ cyano group, a $C_1$-$C_{10}$ cyano group, a $C_1$-$C_6$ cyano group, a $C_2$-$C_6$ cyano group, or a $C_2$-$C_5$ cyano group.

As used herein, the term "carboxyl" may be a $C_1$-$C_{50}$ carboxyl group, a $C_1$-$C_{40}$ carboxyl group, a $C_1$-$C_{30}$ carboxyl group, a $C_1$-$C_{20}$ carboxyl group, a $C_1$-$C_{10}$ carboxyl group, a $C_1$-$C_6$ carboxyl group, a $C_2$-$C_6$ carboxyl group, or a $C_2$-$C_5$ carboxyl group.

As used herein, the term "ternary material" is a ternary material well known in the art, for example, those described in "Ternary Materials for Lithium Ion Batteries-Process Technology and Production Application" (Wang Weidong, Qiu Weihua, Ding Qianqian et al., Chemical Industry Press, May 2015).

Hereinafter, an electrochemical device is taken as an example and the preparation of an electrolytic solution and an electrochemical device containing the electrolytic solution is described in conjunction with specific embodiments. Those skilled in the art will understand that the preparation methods described in the present application are merely exemplary, and any other suitable preparation methods also fall within the protection scope of the present application.

Embodiment 1

The performance evaluation of the lithium ion batteries in the examples and comparative examples of the present application is described below.

1. Preparation of a Lithium-Ion Battery (1) Preparation of an electrolytic solution: in an argon atmosphere glovebox with a moisture content of <10 ppm, ethylene carbonate (EC), diethyl carbonate (DEC), and propylene carbonate (PC) at a weight ratio of 3:4:3 were mixed uniformly. Then a fully dried lithium salt $LiPF_6$ was dissolved in the above non-aqueous solvent, and mixed uniformly, to obtain a basic electrolytic solution in which the concentration of $LiPF_6$ was 1.05 mol/L. Finally, as shown in Table 1, a compound having four —CN functional groups and/or a compound having two —CN functional groups were/was added to the basic electrolytic solution at a certain weight ratio to prepare an electrolytic solution.

Examples of the compound having four —CN functional groups include 1,1,3,3-propanetetranitrile (Formula I-2), 1,1,4,4-butanetetranitrile (Formula I-5), and 1,1,6,6-butanetetranitrile (Formula I-6):

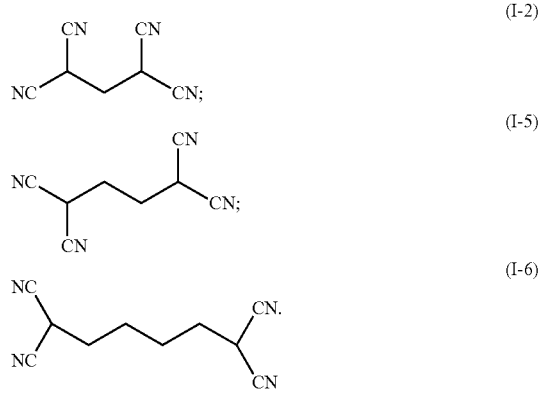

Examples of the compound having two —CN functional groups include succinonitrile (Formula II-1), 1,2-bis(2-cyanoethoxy)ethane (Formula II-2), cyanoethyl cellulose (Formula II-3), and 1,1-cyclopropyldiacetonitrile (Formula II-9):

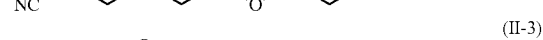

2) Preparation of a cathode: the cathode active material lithium cobaltate (molecular formula is $LiCoO_2$), the conductive agent acetylene black, and the binder polyvinylidene fluoride (PVDF) at a weight ratio of 96:2:2 were stirred and mixed fully in a suitable amount of N-methylpyrrolidone (NMP) as a solvent, to form an uniform cathode slurry. The slurry was applied to an Al foil as a cathode current collector, dried, and pressed to obtain a cathode.

3) Preparation of an anode: the anode active material graphite, the conductive agent acetylene black, the binder styrene-butadiene rubber (SBR), and the thickener Carboxyl methyl Cellulose (CMC) at a weight ratio of 95:2:2:1 were stirred and mixed fully in a suitable amount of deionized water as a solvent, to form uniform anode slurry. The slurry was applied to a Cu foil as an anode current collector, dried, and pressed to obtain a anode.

4) Separator: a porous PE polymer film is used as a separator.

5) Preparation of lithium ion battery: the cathode, the separator, and the anode were stacked in sequence, so that the separator was placed between the cathode and the anode so as to separate them. Then, the system was wound up, and placed in the outer packaging foil. The electrolytic solution prepared above was injected into the dried battery, and after vacuum packaging, standing, formation, shaping, and other procedures, the preparation of the lithium ion battery was completed.

2. Test Method

The electrolytic solutions and lithium ion batteries of Examples 1-18 were prepared according to the above preparation method.

The preparation methods of the electrolytic solution and the lithium ion batteries of Comparative Examples 1-5 were the same as those of Examples 1-18 except that the structure and content of the compound having a —CN functional group in the electrolytic solution were different, wherein Comparative Example 1 does not comprise a compound having a —CN functional group. See Table 1 for details.

The batteries of Examples 1-18 and Comparative Examples 1-5 were subjected to a floating-charge test and a long cycle impedance test.

1) Floating-charge test process: at 25° C., the battery was discharged to 3.0 V at 0.5 C. Then the battery was charged to 4.4V at 0.5 C, charged to 0.05 C at a constant voltage of 4.4V. The battery was placed in an oven at 45° C., and maintained at a constant voltage of 4.4V for 50 days. The thickness changes of the battery were monitored. The initial thickness at 50% SOC (state of charge) was used as a reference.

2) Long cycle impedance test procedure: at 25° C., the battery was charged to 4.4V at 0.7 C, then charged to 0.05 C at a constant voltage of 4.4 V. The battery was discharged to 3.0 V at a constant current of 1.0 C. The impedance changes at 100% SOC during the cycle process of the battery were monitored. The impedance test data after 800 cycles is shown below. The specific test results are shown in Table 1.

TABLE 1

The results of the floating-charge tests and long cycle impedance tests of Examples 1-18 and Comparative Examples 1-5

| Examples | Tetranitrile compound (wt %) | | | Dinitrile compound (wt %) | | | | Floating-charge test | Impedance after 800 cycles/mΩ |
|---|---|---|---|---|---|---|---|---|---|
| | I-2 | I-5 | I-6 | II-1 | II-2 | II-3 | II-9 | | |
| Example 1 | 0.1 | — | — | 0.4 | — | — | — | 7.91% | 39.6 |
| Example 2 | 0.2 | — | — | 4 | — | — | — | 7.82% | 39.4 |
| Example 3 | 4 | — | — | 0.4 | — | — | — | 7.63% | 38.3 |
| Example 4 | 0.5 | — | — | 2 | — | — | — | 7.55% | 37.7 |
| Example 5 | 1 | — | — | 1 | — | — | — | 7.92% | 39.6 |
| Example 6 | 1.5 | — | — | 0.5 | — | — | — | 7.89% | 39.45 |
| Example 7 | 0.6 | — | — | — | 5.4 | — | — | 7.48% | 37.4 |
| Example 8 | 2 | — | — | 3 | — | — | — | 7.61% | 38.05 |
| Example 9 | 3 | — | — | 3 | — | — | — | 7.69% | 38.45 |
| Example 10 | 4 | — | — | 6 | — | — | — | 7.91% | 39.55 |
| Example 11 | 4 | — | — | 11 | — | — | — | 7.82% | 39.1 |
| Example 12 | — | 3 | — | — | 3 | — | — | 7.69% | 38.45 |
| Example 13 | — | 1 | — | — | 3 | — | — | 7.51% | 37.55 |
| Example 14 | — | — | 1 | — | — | 2 | — | 7.89% | 39.45 |
| Example 15 | — | — | 2 | — | — | 3 | — | 7.91% | 39.55 |
| Example 16 | 1 | 1 | — | — | 3 | — | — | 7.52% | 37.6 |
| Example 17 | — | 1 | 1 | — | 2 | 2 | — | 7.59% | 37.95 |
| Example 18 | 0.6 | — | — | — | — | — | 5.4 | 8.21% | 41.1 |
| Comparative Example 1 | — | — | — | — | — | — | — | 50.00% | 80.61 |
| Comparative Example 2 | 2 | — | — | — | — | — | — | 20.00% | 50.1 |
| Comparative Example 3 | — | — | — | 3 | — | — | — | 30.00% | 55.32 |
| Comparative Example 4 | 0.1 | — | — | 0.3 | — | — | — | 10.21% | 45.32 |
| Comparative Example 5 | 30 | — | — | 3 | — | — | — | 7.51% | 70.31 |

It can be seen from the experimental results in Table 1 that since both a tetranitrile compound and a dinitrile compound of certain amounts are added in the electrolytic solutions in Examples 1-18 of the present application, the floating-charge performance and the post-cycle impedance deterioration are obviously improved. The improvements to the floating-charge performance and the post-cycle impedance deterioration of the batteries of Examples 1-17 are better than those in Example 18, because the electrolytic solution in Example 18 contains a dinitrile compound having a three-membered ring structure of Formula II-9, in addition to the tetranitrile compound of Formula I-2. Due to the spatial flexibility, the ring structure results in a larger steric hindrance than the chain structure and the benzene ring, thereby affecting the stabilizing effect of the nitrile compound on the transition metal.

No tetranitrile compound or dinitrile compound additives are added to the electrolytic solution of Comparative Example 1, and thus swelling is obvious during the floating charge, and the post-cycle impedance deterioration is also obvious. The floating-charge performance and the post-cycle impedance of Comparative Example 2 in which only a tetranitrile compound is added and Comparative Example 3 in which only a dinitrile compound is added are both improved to some extent, but the improvements effects are greatly different compared with Examples 1-18 in which both a tetranitrile compound and a dinitrile compound of the present application are added. This is because when a tetranitrile compound is used alone, the nitrile organic film formed from the same cannot protect the active material well due to steric hindrance, and when a dinitrile compound is used alone, good improvement cannot be achieved due to few effective functional groups in the dinitrile compound.

When the two are used in combination, their respective advantages can be exerted well. When the amount of the nitrile compound is small, the cathode material cannot be sufficiently protected, so the floating-charge performance and post-cycle impedance of Comparative Example 4 are deteriorated compared with Example 1.

It can be seen from the test results of Comparative Example 5 that the floating-charge performance is improved when the amount of the nitrile compounds is high. However, when the amount of the nitrile compounds is high, the formed film is thicker, the viscosity of the electrolytic solution is increased and the polarization is increased, such that the post-cycle impedance is deteriorated.

Embodiment 2

The nitrile compound can stabilize the surface of the active material, especially the transition metal on the surface of the cathode. The organic film of nitrile compound can significantly improve the floating-charge performance and increased post-cycle impedance of a battery. A substance having a sulfur-oxygen double bond functional group can form lithium sulfonate on the surface of the electrode active material, the stability of which at high temperature is better than that of lithium carbonate. Adding a substance having a sulfur-oxygen double bond functional group can further enhance the high-temperature storage performance of a battery. As shown in Table 2, a substance having a sulfur-oxygen double bond functional group was further added to the electrolytic solution of Example 7, to obtain Examples 19-23. The floating-charge performance and the 85° C.-10 hr storage performance of batteries were tested.

Examples of the compound having a sulfur-oxygen double bond functional group are 2,2-difluoroethyl triflate (Formula III-5), and 1,3-propene sultone (Formula III-7):

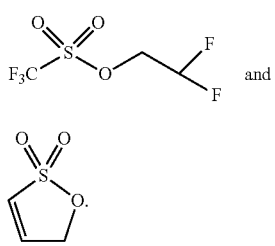

1) Floating-charge test procedure: the floating-charge test procedure was the same as that described in Embodiment 1.

2) 85° C.-10 hr storage performance test procedure: at 25° C., the voltage of the battery was adjusted to 50% capacity at 0.5 C to test the thickness of the battery at 50% capacity. Then, it was charged to 4.4 V at 0.5 C, placed in an oven at 85° C., stored at 4.4 V for 10 hrs, and tested for the thickness after 10 hours. The initial thickness at 50% capacity was used as a reference.

TABLE 2

Results of floating-charge tests and 85° C.-10 hr storage tests of Example 7 and Examples 19-23

| Examples | Compound having sulfur-oxygen double-bond functional group | | Floating-charge test | 85° C.-10 hr storage performance |
|---|---|---|---|---|
| | III-5 (wt %) | III-7 (wt %) | | |
| Example 7 | — | — | 7.48% | 7.32% |
| Example 19 | 0.1 | — | 7.49% | 7.12% |
| Example 20 | 5 | — | 7.50% | 6.32% |
| Example 21 | 7 | — | 7.48% | 6.31% |
| Example 22 | — | 3 | 7.47% | 6.67% |
| Example 23 | 2 | 3 | 7.49% | 6.31% |

It can be seen from the test results of Examples 19-23 and Example 7 that the addition of a substance having a sulfur-oxygen double bond functional group can further improve the high-temperature storage performance of the battery under the premise of ensuring the floating-charge performance. With the amount of the substance having a sulfur-oxygen double bond functional group increasing, the improvement to storage performance tends to increase.

Embodiment 3

A cyclic carbonate ester can form an organic composite film with good flexibility at the anode. The organic composite film is less affected by the expansion of active particles during the cycle, such that the cycle performance of the battery is well improved. As shown in Table 3, a cyclic carbonate ester was added at a weight ratio to the electrolytic solution of Example 7 to obtain Examples 24-28, and the capacity retention rate after 800 cycles was measured. The test results are shown in Table 3.

Examples of the cyclic carbonate ester are vinylene carbonate (VC), fluoroethylene carbonate (FEC).

1) Floating-charge test procedure: the floating-charge test procedure was the same as that described in Embodiment 1.

2) Cycle test procedure at 25° C.: at 25° C., the battery was discharged to 3.0 V at 0.5 C and then charged to 4.4 V at a current of 0.5 C. Repeating such cycles, the discharge capacity attenuation percentage is calculated using the discharge capacity of the different number of cycles based on the discharge capacity of the first cycle.

TABLE 3

Results of floating-charge tests and cycle tests at 25° C. of Example 7 and Examples 24-28

| Examples | Cyclic carbonate ester | | Floating-charge test | 25° C./800 cycles |
|---|---|---|---|---|
| | FEC (wt %) | VC (wt %) | | |
| Example 7 | — | — | 7.48% | 84.3% |
| Example 24 | 5 | — | 7.48% | 87.2% |
| Example 25 | 10 | — | 7.50% | 90.1% |
| Example 26 | 30 | — | 7.51% | 88.1% |
| Example 27 | — | 2 | 7.52% | 85.2% |
| Example 28 | 4 | 1 | 7.53% | 87.6% |

It can be seen from the test results of Examples 24-28 and Example 7 that after the cyclic carbonate ester is added, the cycle capacity retention rate of the battery is improved, and with the amount of the cyclic carbonate ester increasing, the capacity retention rate increases in a positive correlation therewith.

Embodiment 4

Carboxylate ester has a low viscosity and can significantly improve the rate performance of a battery when used in combination with a nitrile compound. As shown in Table 4, a carboxylate ester was further added at a weight ratio to the electrolytic solution of Example 7 to obtain Examples 29-34, wherein examples of the carboxylate are propyl propionate (PP) and fluoroethyl acetate (FEA).

1) Floating-charge test procedure: the floating-charge test procedure was the same as that described in Embodiment 1.

2) Rate test procedure: the battery was charged to 4.4V at a current of 0.5 C at 25° C. and then to 0.05 C at a CV of 4.4V. After being fully charged, the battery was discharged to 3.0V respectively at 0.5 C and 2 C. The discharge capacity of the battery was monitored at different currents, with the discharge capacity at 0.5 C as a reference.

TABLE 4

Results of floating-charge tests and rate tests of Example 7 and Examples 29-34

| Examples | Carboxylate ester | | Floating-charge test | 2C rate |
|---|---|---|---|---|
| | PP (wt %) | FEA (wt %) | | |
| Example 7 | — | — | 7.48% | 70.10% |
| Example 29 | 5 | — | 7.47% | 75.43% |
| Example 30 | 10 | — | 7.49% | 80.12% |
| Example 31 | 20 | — | 7.50% | 88.50% |
| Example 32 | 40 | — | 7.52% | 89.20% |
| Example 33 | — | 10 | 7.50% | 81.20% |
| Example 34 | 5 | 10 | 7.49% | 88.60% |

It can be seen from the test results of Examples 29-34 and Example 7 that after the carboxylate ester is added, the rate performance of the battery is greatly improved, and with the amount of the carboxylate increasing, the capacity retention rate at 2 C rate increases in a positive correlation therewith.

Embodiment 5

The high temperature stability of a ternary material is significantly improved compared to a lithium cobalt material. However, the use of a ternary material alone is greatly affected by the voltage and the manufacturing processes. Due to its own characteristics, the ternary material is prone to dissolution of transition metals nickel, manganese, and cobalt. The dissolved transition metals further catalyze the reaction of the electrolytic solution, which results in potential safety hazards to the battery. The —CN functional group in the nitrile material coordinates with the transition metals nickel, manganese and cobalt in the ternary material, which can stabilize the transition metals and reduce their dissolution, and thus is conducive to the structure stability of the ternary material. With the increase of the —CN functional group, the stabilizing effect on the material is gradually enhanced. The cathode of the lithium ion battery of the present application uses a mixed system of lithium cobalt and a ternary material. The tetracyano compound and the biscyano compound in the system further improve the safety performance of the battery under the premise of ensuring the floating-charge performance. As shown in Table 5, the cathode material in Example 7 was replaced with $LiCoO_2$ and $Li[Ni_{0.5}Co_{0.2}Mn_{0.3}]O_2$ mixed at a certain ratio to obtain Examples 35-38.

1) Floating-charge test procedure: the floating-charge test procedure was the same as that described in Embodiment 1.

2) Procedure for heating test in chamber: the battery was charged to 4.4V at a current of 0.5 C at 25° C. and then to 0.05 C at a CV of 4.4V. After being fully charged, the battery was placed in a high-low temperature test chamber, heated to 130° C., and maintained for 1 hr at 130° C. The battery was monitored, and determined to pass if no firing and explosion occurred.

It can be found from the test results of Example 7 and Examples 35-38 that using the mixed cathode has a significant improvement on the heat withstanding performance of the battery under the premise of ensuring the floating-charge performance of the battery.

Embodiment 6

As shown in Table 6, a compound having a sulfur-oxygen double bond, a cyclic carbonate ester and a carboxylate ester were further added to the electrolytic solution of Example 7, and the cathode in Example 7 was replaced with a mixed cathode, to obtain Examples 39-44. The floating-charge performance and the capacity retention rate of Example 7 and Examples 39-44 were determined. The test results are shown in Table 6.

1) Floating-charge test procedure: The floating-charge test procedure was the same as that described in Embodiment 1.

2) Test procedure for capacity retention rate after long-time storage: the battery was charged to 4.4 V at a current of 0.5 C at 25° C. and then to 0.05 C at a CV of 4.4 V, and discharged to 3.0 V at a current of 0.2 C. The actual discharge capacity of the battery was recorded. The battery was charged to 4.4 V at a current of 0.5 C and then to 0.05 C at a CV of 4.4 V. The battery was stored at 45° C. for 90 days. After 90 days, the battery was cooled at 25° C. for 2 h, and discharged to 3.0 V at a current of 0.2 C, and the discharge capacity of the battery was recorded. The capacity retention rate was calculated with the discharge capacity of the initial first cycle as a reference.

TABLE 6

Results of floating-charge tests and capacity retention rates after long-time storage of Example 7 and Examples 39-44

| Examples | I-2 (wt %) | II-2 (wt %) | III-7 (wt %) | FEC (wt %) | PP (wt %) | $LiCoO_2:Li[Ni_{0.5}Co_{0.2}Mn_{0.3}]O_2$ | Floating-charge test | Capacity retention rate |
|---|---|---|---|---|---|---|---|---|
| Example 7 | 0.6 | 5.4 | — | — | — | 1:0 | 7.48% | 83.0% |
| Example 39 | 0.6 | 5.4 | 3 | 5 | — | 1:0 | 7.47% | 86.3% |
| Example 40 | 0.6 | 5.4 | 3 | — | 20 | 1:0 | 7.48% | 86.4% |
| Example 41 | 0.6 | 5.4 | — | 5 | 20 | 1:0 | 7.49% | 86.5% |
| Example 42 | 0.6 | 5.4 | 3 | 5 | 20 | 1:0 | 7.50% | 86.6% |
| Example 43 | 0.6 | 5.4 | 3 | 5 | 20 | 8:2 | 7.51% | 85.5% |
| Example 44 | 0.6 | 5.4 | 3 | 5 | 20 | 6:4 | 7.50% | 85.4% |

TABLE 5

Results of floating-charge tests and heating tests in chamber of Example 7 and Examples 35-38

| Examples | Cathode material $LiCoO_2:Li[Ni_{0.5}Co_{0.2}Mn_{0.3}]O_2$ | Floating-charge test | 130° C.-1 h heating |
|---|---|---|---|
| Example 7 | 1:0 | 7.48% | 8/10 pass |
| Example 35 | 8:2 | 7.48% | 10/10 pass |
| Example 36 | 7:3 | 7.49% | 10/10 pass |
| Example 37 | 6:4 | 7.50% | 10/10 pass |
| Example 38 | 5:5 | 7.49% | 10/10 pass |

It can be found from the test results of Example 7 and Examples 39-44 that the use of the combination of various additives of the present application in combination with the mixed cathode material can improve the capacity retention rate after long-term storage of the battery.

References throughout the specification to "embodiments", "partial embodiments", "one embodiment", "another example", "example", "specific example" or "partial examples" mean that at least one embodiment or example of the application includes specific features, structures, materials or characteristics described in the embodiments or examples. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the particular features, structures, materials or characteristics herein may be combined in any suitable manner in one or more embodiments or examples.

While the illustrative embodiments have been shown and described, it will be understood by those skilled in the art that the embodiments are not to be interpreted as limitations to the present invention, and modifications, substitutions and changes can be made to the embodiments without departing from the spirit and scope of the present application.

The above-described embodiments of the present invention are intended to be illustrative only. Numerous alternative embodiments may be devised by persons skilled in the art without departing from the scope of the following claims.

What is claimed is:

1. An electrolytic solution, comprising a first compound of structural Formula (I) and a second compound of structural Formula (II):

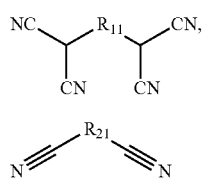

in which $R_{11}$ is one or more selected from a substituted or unsubstituted alkylene group, a substituted or unsubstituted alkenylene group, a substituted or unsubstituted arylene group, and a substituted or unsubstituted cycloalkylene group, wherein when substituted, the substituent is one or more selected from halogen, an alkyl group or an alkenyl group; and $R_{21}$ is selected from a substituted or unsubstituted alkylene group, a substituted or unsubstituted alkenylene group, a substituted or unsubstituted arylene group, a substituted or unsubstituted $R_0$—S—R group, and a substituted or unsubstituted chain ether group, wherein $R_0$ and R are each independently a substituted or unsubstituted alkylene group, and wherein when substituted, the substituent is one or more selected from halogen, an alkyl group or an alkenyl group, wherein, based on the total weight of the electrolytic solution, the percent by weight (X) of the first compound and the percent by weight (Y) of the second compound meet:

1 wt %≤(X+Y)≤15 wt %; and 0.05≤(X/Y)≤5.

2. The electrolytic solution according to claim 1, wherein:
$R_{11}$ is selected from a substituted or unsubstituted $C_1$-$C_{10}$ alkylene group, a substituted or unsubstituted $C_2$-$C_{10}$ alkenylene group, a substituted or unsubstituted $C_6$-$C_{10}$ arylene group, and a substituted or unsubstituted $C_6$-$C_{10}$ cycloalkylene group, wherein when substituted, the substituent is fluorine; and
$R_{21}$ is selected from a substituted or unsubstituted $C_1$-$C_{10}$ alkylene group, a substituted or unsubstituted $C_2$-$C_{10}$ alkenylene group, a substituted or unsubstituted $R_0$—S—R group, a substituted or unsubstituted $R_1$—O—$R_2$ group, and a substituted or unsubstituted $R_3$—O—$R_4$—O—$R_5$ group, wherein $R_0$, R, $R_1$, $R_2$, $R_3$, $R_4$, and $R_5$ are each independently a substituted or unsubstituted $C_1$-$C_4$ alkylene, and wherein when substituted, the substituent is fluorine.

3. The electrolytic solution according to claim 1, wherein:
the first compound comprises one or more of the following compounds:

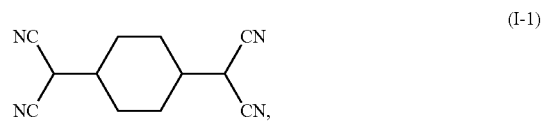

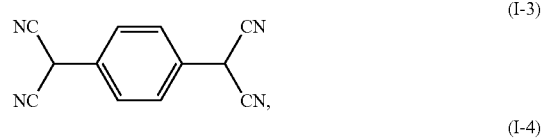

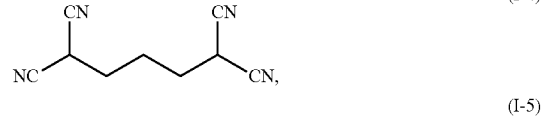

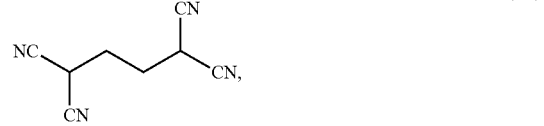

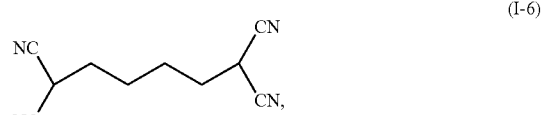

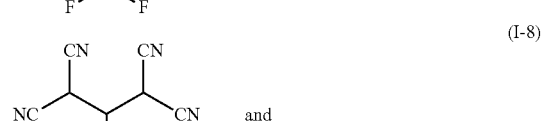

and

4. The electrolytic solution according to claim 1, wherein the second compound comprises one or more of the following compounds

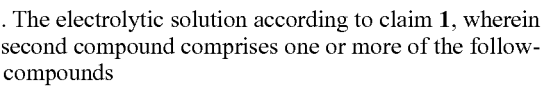

-continued

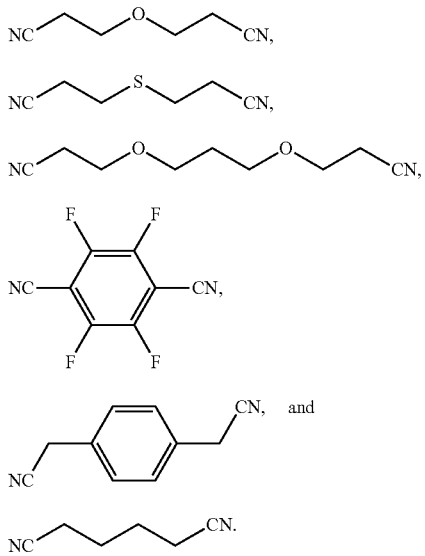

(II-3)
(II-4)
(II-5)
(II-6)
(II-7)
(II-8)

5. The electrolytic solution according to claim 1, wherein, based on the total weight of the electrolytic solution, the percent by weight (X) of the first compound and the percent by weight (Y) of the second compound meet:

3.5 wt %≤(X+Y)≤15 wt %; and 0.05≤(X/Y)≤5.

6. The electrolytic solution according to claim 1, wherein, based on the total weight of the electrolytic solution, the percent by weight (X) of the first compound and the percent by weight (Y) of the second compound meet:

1 wt %≤(X+Y)≤15 wt %; and 0.1≤(X/Y)≤3.

7. The electrolytic solution according to claim 1, further comprising a compound having a sulfur-oxygen double bond, wherein the compound having a sulfur-oxygen double bond comprises a compound of structural Formula (III-A) or a compound of structural Formula (III-B):

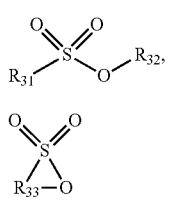

(III-A)

(III-B)

or a combination thereof, in which $R_{31}$ and $R_{32}$ are each independently selected from a substituted or unsubstituted alkyl group, a substituted or unsubstituted alkenyl group, a substituted or unsubstituted aryl group, and a substituted or unsubstituted heterocyclic group, wherein heteroatom is one or more selected from O, S, and P, wherein when substituted, the substituent is one or more selected from halogen, nitro, cyano, carboxyl, or a sulfonic group; and $R_{33}$ is selected from a substituted or unsubstituted alkylene group, and a substituted or unsubstituted $C_2$-$C_{10}$ alkenylene group, wherein the alkylene group optionally contains a heteroatom, wherein the heteroatom is one or more selected from O, S, and P, and wherein when substituted, the substituent is one or more selected from halogen, an alkyl group or an alkenyl group.

8. The electrolytic solution according to claim 7, wherein the compound having a sulfur-oxygen double bond comprises one or more of the following compounds:

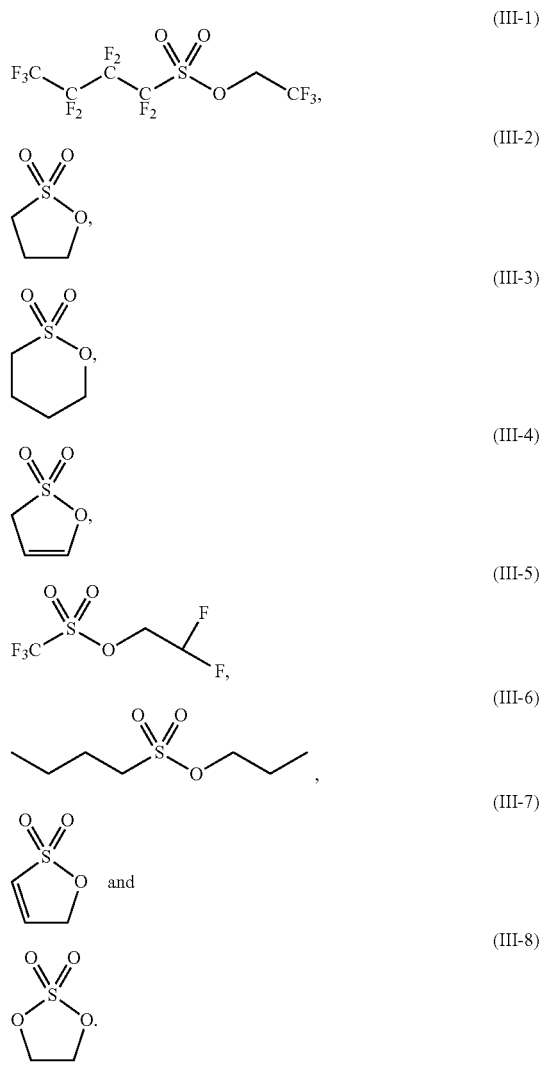

(III-1)
(III-2)
(III-3)
(III-4)
(III-5)
(III-6)
(III-7)
(III-8)

9. The electrolytic solution according to claim 1, further comprising a cyclic carbonate of structural Formula IV:

(IV)

in which $R_{41}$ is selected from a substituted or unsubstituted alkylene group, and a substituted or unsubstituted $C_2$-$C_{10}$ alkenylene, wherein when substituted, the substituent is one or more selected from halogen, a $C_1$-$C_6$ alkyl group, or a $C_2$-$C_6$ alkenyl group.

10. The electrolytic solution according to claim 9, wherein the cyclic carbonate ester comprises one or more selected from the group consisting of:

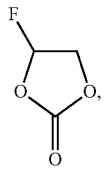

(IV-1)

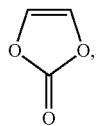

(IV-2)

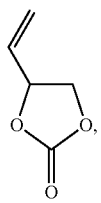

(IV-3)

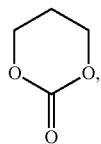

(IV-4)

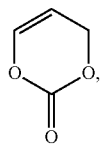

(IV-5)

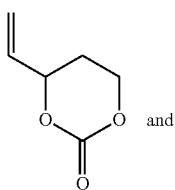 and (IV-6)

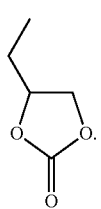

(IV-7)

11. The electrolytic solution according to claim 1, further comprising a carboxylate ester of structural Formula V:

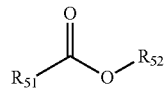

(V)

in which $R_{51}$ and $R_{52}$ are each independently selected from a substituted or unsubstituted alkylene group, and a substituted or unsubstituted alkenylene, wherein when substituted, the substituent is one or more selected from halogen, a $C_1$-$C_6$ alkyl group or a $C_2$-$C_6$ alkenyl group.

12. The electrolytic solution according to claim 11, wherein the carboxylate ester comprises one or more of the following compounds:

(V-1)

(V-2)

, and

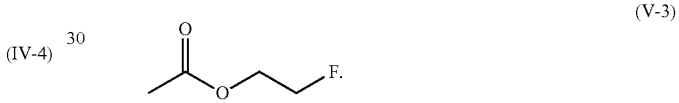

(V-3)

13. An electrochemical device, comprising a cathode, an anode, a separator disposed between the cathode and the anode, and an electrolytic solution wherein the electrolytic solution, comprises a first compound of structural Formula (I) and a second compound of structural Formula (II):

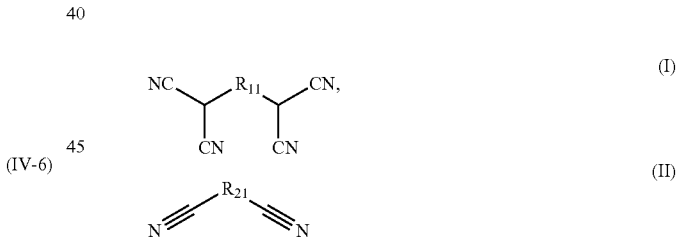

(I)

(II)

in which $R_{11}$ is one or more selected from a substituted or unsubstituted alkylene group, a substituted or unsubstituted alkenylene group, a substituted or unsubstituted arylene group, and a substituted or unsubstituted cycloalkylene group, wherein when substituted, the substituent is one or more selected from halogen, an alkyl group or an alkenyl group; and $R_{21}$ is selected from a substituted or unsubstituted alkylene group, a substituted or unsubstituted alkenylene group, a substituted or unsubstituted arylene group, a substituted or unsubstituted $R_0$—S—R group, and a substituted or unsubstituted chain ether group, wherein $R_0$ and R are each independently a substituted or unsubstituted alkylene group, and wherein when substituted, the substituent is one or more selected from halogen, an alkyl group or an alkenyl group, wherein, based on the total weight of the electrolytic solution, the percent by weight (X) of the first compound and the percent by weight (Y) of the second compound meet:

1 wt %≤(X+Y)≤15 wt %; and 0.05≤(X/Y)≤5.

14. The electrochemical device according to claim 13, wherein
the cathode comprises a cathode current collector and a cathode film coated on the cathode current collector; and the anode comprises an anode current collector and an anode film coated on the anode current collector, the cathode film comprises a cathode active material,
wherein, the cathode active material comprises one or more of: lithium cobaltate, a ternary material, lithium iron phosphate, lithium manganate or any combination thereof, wherein the ternary material comprises one or more of: a lithium nickel cobalt manganese oxide or a lithium nickel cobalt aluminum oxide.

15. The electrochemical device according to claim 14, wherein the cathode active material comprises a mixture of lithium cobaltate and lithium nickel cobalt manganese oxide.

16. The electrochemical device according to claim 14, wherein the ratio of lithium cobaltate to lithium nickel cobalt manganese oxide is about 1:9-9:1.

17. The electrochemical device according to claim 14, wherein the ratio of lithium cobaltate to lithium nickel cobalt manganese oxide is about 2:8-4:6.

18. An electronic device, comprising an electrochemical device that includes a cathode, an anode, a separator disposed between the cathode and the anode, and an electrolytic solution wherein the electrolytic solution, comprises a first compound of structural Formula (I) and a second compound of structural Formula (II):

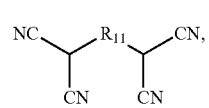 (I)

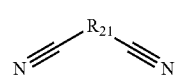 (II)

in which $R_{11}$ is one or more selected from a substituted or unsubstituted alkylene group, a substituted or unsubstituted alkenylene group, a substituted or unsubstituted arylene group, and a substituted or unsubstituted cycloalkylene group, wherein when substituted, the substituent is one or more selected from halogen, an alkyl group or an alkenyl group; and $R_{21}$ is selected from a substituted or unsubstituted alkylene group, a substituted or unsubstituted alkenylene group, a substituted or unsubstituted arylene group, a substituted or unsubstituted $R_0$—S—R group, and a substituted or unsubstituted chain ether group, wherein $R_0$ and R are each independently a substituted or unsubstituted alkylene group, and wherein when substituted, the substituent is one or more selected from halogen, an alkyl group or an alkenyl group, wherein, based on the total weight of the electrolytic solution, the percent by weight (X) of the first compound and the percent by weight (Y) of the second compound meet:

1 wt %≤(X+Y)≤15 wt %; and 0.05≤(X/Y)≤5.

* * * * *